Jan. 14, 1964 J. W. MEESE 3,117,375
THIN WALL CONDUIT AND CABLE CUTTER WITH CLAMPING MEANS
Filed July 17, 1961 4 Sheets-Sheet 1
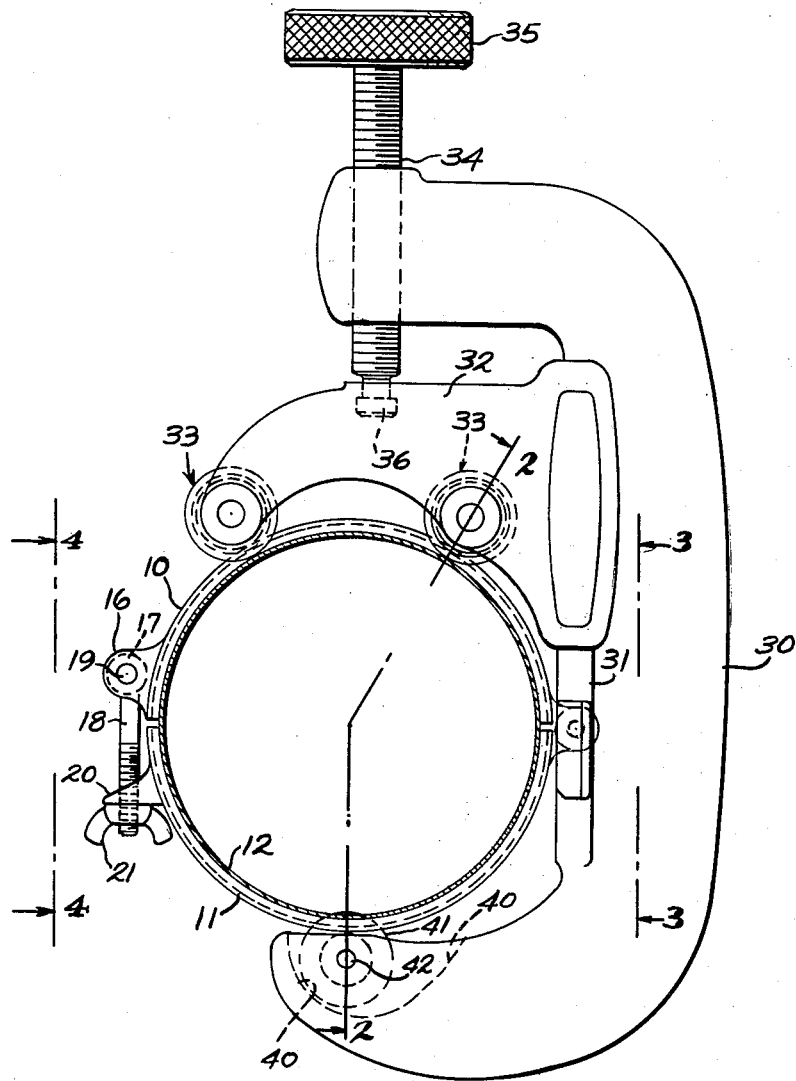
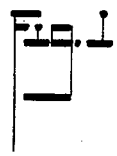
INVENTOR.
JOHN W. MEESE
BY
HIS ATTORNEY Jan. 14, 1964  J. W. MEESE  3,117,375
THIN WALL CONDUIT AND CABLE CUTTER WITH CLAMPING MEANS
Filed July 17, 1961  4 Sheets-Sheet 2
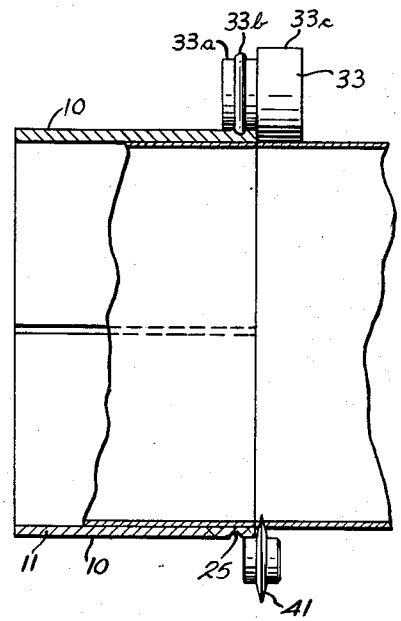
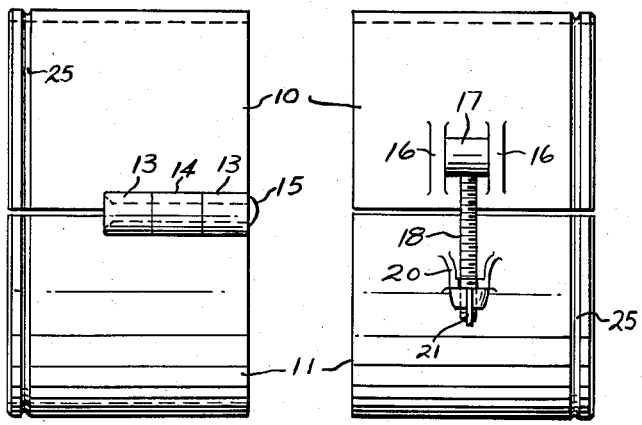
INVENTOR.
JOHN W. MEESE
BY
J. O. Douglas
HIS ATTORNEY Jan. 14, 1964   J. W. MEESE   3,117,375
THIN WALL CONDUIT AND CABLE CUTTER WITH CLAMPING MEANS
Filed July 17, 1961   4 Sheets-Sheet 3
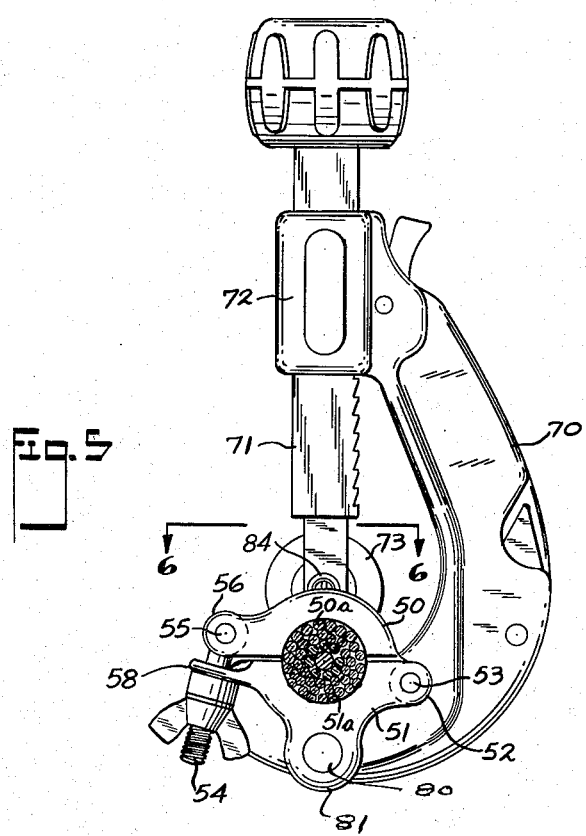
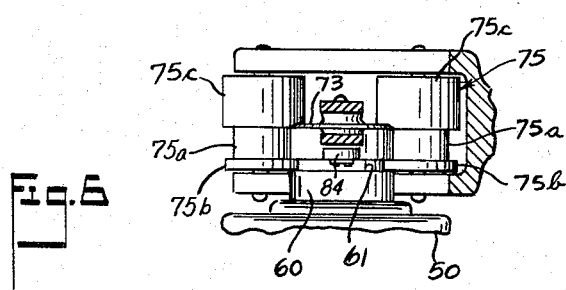
INVENTOR.
JOHN W. MEESE
BY
J. D. Douglas
HIS ATTORNEY

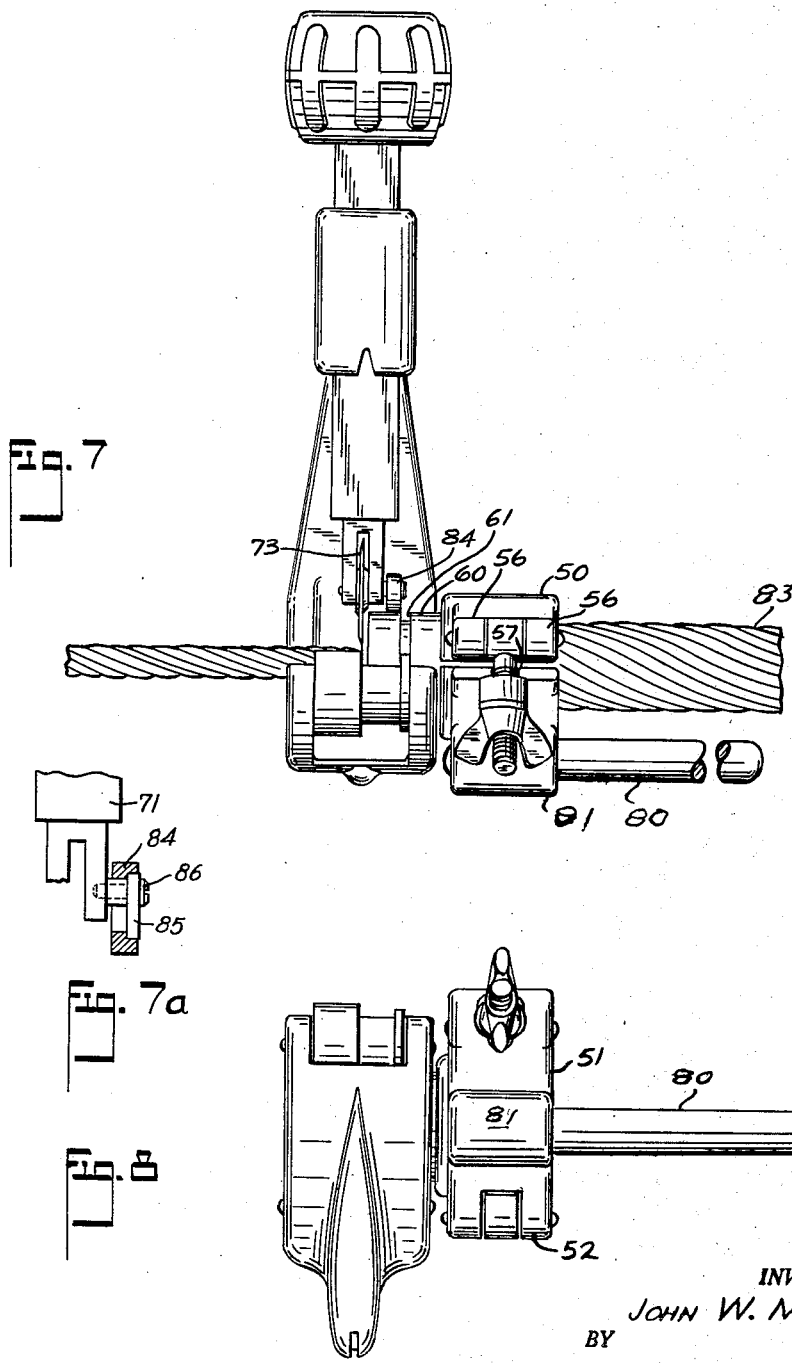

United States Patent Office 3,117,375
Patented Jan. 14, 1964

3,117,375
THIN WALL CONDUIT AND CABLE CUTTER
WITH CLAMPING MEANS
John W. Meese, Avon, Ohio, assignor to The Ridge Tool
Company, Elyria, Ohio, a corporation of Ohio
Filed July 17, 1961, Ser. No. 124,423
6 Claims. (Cl. 30—96)

This invention relates to cutting mechanism and more particularly to a device for cutting thin wall pipe or other articles where the article to be cut is clamped during the cutting operation.

The invention about to be described will be described in conjunction with its operation in cutting large thin wall tubing and in the cutting of multiple wire cables. It will be understood, however, that this is representative of only two instances where the device may be used and that other uses of the device will be apparent to those versed in the art.

As is well known, it is common practice to cut large thin wall tubing, such as light weight irrigation pipe, downspouts and the like to various lengths, depending upon the total length of the assembled tubing desired, by using an ordinary hack saw or a pair of tin snips. It will be appreciated that the use of a hack saw or tin snips to do the cutting is a difficult operation. In the cutting of irrigation pipe the material is too thick to cut with tin snips and when using a hack saw it takes a considerable amount of time and is difficult because of the angle at which the hack saw engages the work. The difficulty of cutting with tin snips is also well known, particularly where the pipe is only two or three inches in diameter.

There is also occasion to cut multiple wire cable, such as is used in transmission lines when splices are to be made. Such a line usually comprises one or more layers of aluminum wire wrapped around a core of steel wire. The core may be a single wire or it may include a central steel wire with several steel wires wrapped around it. It is desirable frequently to cut the outer aluminum wires away and leave the inner steel wires, which are mechanical load bearing wires, intact. In order to do this, previously it was customary to either cut around the entire cable with a hack saw or, when it was near the end of the cable, to spread apart the outer wires and cut them singly. Either way was difficult and undesirable.

Although it would be desirable to cut the thin wall pipe with a tubing cutter, it was impractical to do this because the wall was so thin that the pressure of the cutter blade caused it to collapse. The present invention contemplates a device which may be used with a cutter of the tubing type and wherein the wall of the conduit is so supported that it will not collapse and the cutting may proceed easily, quickly and accurately. It may be used to cut metal, plastic or composition pipes. A device of the same character is used to cut cable. In this instance, the cable is clamped so that the strands do not move and the outer layers, or for that matter the entire cable may be cut in the same manner as a piece of tubing or pipe.

Still other advantages of the invention and the invention itself will become more apparent from the following description of an embodiment thereof, which description is illustrated by the accompanying drawings and forms a part of this specification.

In the drawings:

FIG. 1 is a side elevational view of the clamp and cutter of the invention, in position on a thin wall tube;

FIG. 2 is a view in section of the clamp means in place on a pipe, shown in section and with a cutter wheel and back-up roller, without the cutter frame, shown in their respective positions;

FIG. 3 is an elevational view of the clamp means taken from a plane indicated by the line 3—3 of FIG. 1;

FIG. 4 is an elevational view of the clamp means taken from the plane indicated by the lines 4—4 of FIG. 1;

FIG. 5 is a view similar to FIG. 1 of a modified form of the device, shown in position on a cable or transmission line;

FIG. 6 is a fragmentary section taken on the line 6—6 of FIG. 5;

FIG. 7 is an elevational view at right angles to that of FIG. 1;

FIG. 7a is an enlarged detail of the adjustable stop; and

FIG. 8 is a bottom plan view.

Referring now to the drawings, throughout which like parts are designated by the reference characters, briefly the invention comprises a clamp means which surrounds the article to be cut, which holds and supports the article and which has a guide portion for engagement with a cutter tool that is revolved about the guide part and cuts the article.

In FIGS. 1 to 4 inclusive, there has been illustrated a tubing mechanism for the cutting of thin wall tubing, such as is used for irrigation purposes or in downspouts. It comprises a clamp means for surrounding and clamping the pipe including a pair of semi-cylindrical clamp members 10 and 11 arranged to surround the pipe 12. At one side and toward the end, the members are provided with eyes 13 and 14 for receiving a hingepin 15 whereby the two parts are hingedly connected together. On the opposite side the member 10 is provided with a pair of ears 16 between which the eye 17 of an eye bolt 18 is pivotally secured by a pin 19. The threaded end of the eye bolt extends through a forked bracket 20 and a thumb nut 21 is threaded on the end and engageable with the bracket. It will thus be seen that the clamp means may be easily removed or attached to a pipe and may clamp the pipe securely by adjusting the thumb screw 21. When so held, the pipe cannot readily collapse or distort and considerable pressure may be exerted without the wall bending inward.

As best shown in FIGS. 2 and 3, the clamp means is provided with a peripheral groove 25, which extends around the periphery, spaced from the edge which serves as a guide means for the tube cutter.

The tube cutter comprises a C-shaped frame 30 having ways 31 on which is slidably journalled a housing 32. The housing 32 carries a pair of back-up rolls 33 which engage with the clamp means. Adjustment of the housing 32 and hence the rolls 33 toward and away from the work, is effected by a threaded screw 34 having an operating handle 35 and an end 36 rotatably journalled in the housing 32.

As clearly shown in FIG. 2, the back-up rolls 33 each includes a first cylindrical body portion 33a having a circumferential rib 33b arranged to ride in and be guided by the groove 25. Adjacent the first portion is an enlarged cylindrical second portion 33c which is of a size such that it engages with the pipe 11 at the end of the clamp means but does not exert undue pressure thereon.

The other end of the frame 30 is formed with a pocket 40 in which a cutter wheel 41 is rotatably journalled on a pin 42.

In operation, the clamp means is opened up by unscrewing the nut 21 and moving the eye bolt 18 out of engagement with the forked bracket 20. It is then placed around the pipe to be cut, with the end adjacent the groove 25 at exactly the point where the pipe is to be cut. The eye bolt is then swung into the bracket 20, the nut 21 tightened until the clamp members are securely engaged with the pipe. Then the cutter tool is opened up by rotating the screw 34 outward and retracting the cutter housing with its back-up rolls until it may be slipped over the clamp member, and the back-up rolls 33, with its rib 33b seated in the groove 25, where it is held. The cutter housing is then advanced until the cutter blade engages with the pipe alongside the end of the clamp means.

The device is then rotated around the pipe and the clamp means, with the rib 33b of the back-up roller rolling in and guided by the groove 25 and the enlarged part 33c riding on the pipe adjacent the end of the clamp means. At the same time the screw 34 is turned to advance the rolls and cause the cutter wheel 41 to cut into the pipe.

The clamp means holds the pipe against collapsing and guides the cutter so that the cut is straight around the pipe and does not have a tendency to provide a helical cut as is commonly realized with pipe cutters cutting large diameter pipe.

When the pipe is severed, the cutter is released by backing up the cutter wheels and removed from the clamp means and the clamp means released by loosening the thumb screw 21, after which the eyebolt 18 may be swung outward and the clamp means sections swung apart free from the pipe.

As previously stated, the same general design of cutter may be used for the cutting of multiple wire cables or transmission lines sometimes called multiple "stranded" cable as illustrated in FIGS. 5 to 8 inclusive.

In this instance, since the cable is usually considerably smaller than a pipe, the cable clamping means may be made considerably smaller. It comprises a pair of clamp members 50—51 having semi-cylindrical inner cable clamping surfaces 50a and 51a. The two parts are held together on one side by a hinge 52 and the usual hinge pin 53. At the opposite side the parts are removably secured together by an eyebolt 54 having its eye mounted on a pin 55 between a pair of ears 56. The threaded part of the eyebolt may be swung over into the slot 57 formed by the fork 58 on the half element 51.

The cable may thus be gripped in the same manner as the pipe.

The ends of the clamp members are provided with semi-cylindrical bosses 60 having a groove 61 spaced from the end, which, when the clamp means is on the end of the cable, provides a support and a guide member for the cutter tool the same as previously described in the other embodiment.

In this instance, the cutter includes a frame 70 having a cutter wheel advancing member 71 disposed in the end 72 for moving a cutter wheel 73 into the work.

Two back-up rollers 75 are provided carried by the end of the frame and each comprising a small diameter part 75a having a circumferential rib 75b, at its end, for engagement in the groove 61. Like the other embodiment, the rollers have an enlarged end part 75c where they engage the periphery of and have a bearing on the cable at the point where it projects from the cable clamp means.

A handle 80 is provided seated in an ear 81 on the clamp part 52 which facilitates handling. In use the handle extends alongside the cable 83.

As can best be seen in FIG. 6, the cutter blade 73 is provided with one side being perpendicular from its hub to its periphery, this being the side that is next to the end of the guide means during a cutting operation. The outside is beveled in the usual manner to provide strength. By this construction, the blade may be operated with the cutting taking place very close to the place where the cable is gripped. In the interest of clarity of disclosure, the wheel 73 is shown spaced slightly from the end of the guide 60. This enables the cable to be cut closer to the clamp means and assures that the separate strands will not move when being cut. The cutter may be of the type shown in the copending application of Clyde E. Wright, Serial No. 829,361, filed July 24, 1959, now Patent No. 3,022,575, which was granted February 27, 1962, which has the advantage that the cutter advancing member 71 may be quickly and easily advanced and retracted, facilitating the operation of the device and particularly the attachment of the cutter to the clamp means.

The operation of the device is the same as that previously described.

An additional feature is shown in FIG. 7 and comprises a stop member 84 carried on the support for the cutter wheel 73, which limits the depth of cut that can be made by the wheel by engaging with the guide surface on the clamp member, thus preventing nicking of the cable core. This roller may be made adjustable as to height as best shown in FIGS. 7 and 7a being eccentrically mounted so as to adjust the depth of cut of the wheel 73. As shown in FIG. 7a the roller 84 is mounted on an eccentric 85, the position of which may be adjusted by the screw 86.

Having thus described the invention in some embodiments thereof, I am aware that numerous and extensive departures may be made therefrom without departing from the spirit of the invention as defined in the appended claims.

I claim:

1. An article cutting mechanism including means for clamping an article to be cut and a tool for cutting the article and guide means on the clamp for guiding the cutting tool around the article to perform a cutting operation on said article, said clamp means including a pair of article clamping members having semi-cylindrical seats for engagement with and surrounding said article, said clamp members having hinge means for pivotally connecting them together along one side and adjacent one end and movable apart by virtue of the hinge means and to be applied to the article from one side, and said cutting tool guide means extending beyond the hinge means and, when the clamp means is in clamping engagement with an article, comprising a substantially cylindrical guide portion, said cutting tool having a guiding roller, and said cutting tool guide means and said guiding roller having a cooperating rib and groove for maintaining guiding engagement with each other, said cutting tool having a cutting blade extending into engagement with said article alongside said clamping means.

2. An apparatus as described in claim 1, wherein the cooperating rib and groove are on the guiding roller and cylindrical guide portion respectively.

3. A device as described in claim 1, wherein said guide roller has a portion disposed in contact with the article, juxtaposed to the end of the clamp means.

4. A device as described in claim 1, wherein said clamp means is provided with a handle that extends alongside the cable during the cutting operation in close enough proximity thereto that the cable and handle may be grasped by the same hand.

5. A device as described in claim 1, wherein said cutting tool is provided with cutter advancing means and adjustabel stop means is carried by the cutter advancing means and contacts with the clamp means to limit the depth of the completed cut made by the cutter upon advancement of the cutter toward the article.

6. An article cutting mechanism including means for clamping an article to be cut and a tool for cutting the article and guide means on the clamp for guiding the cutting tool around the article to perform a cutting operation on said article, said clamp means including a pair of article clamping members having semi-cylindrical seats for engagement with and surrounding said article, said clamp members having hinge means for pivotally connecting them together along one side and adjacent one end and movable apart by virtue of the hinge means and applied to the article from one side, and said cutting tool guide means extending beyond the hinge means and, when the clamp means is in clamping engagement with an article, comprising a substantially cylindrical guide portion, said cutting tool comprising an open sided frame having guiding rollers at one end, and said cutting tool guide means and at least one of said guiding rollers having a cooperating rib and groove for maintaining guiding engagement with each other, said cutting tool having a cutting blade extending from the other end of the frame into engagement with said article closely juxtaposed to the end of the guide means, said cutting tool being movable into engagement with the guiding means and the article to be cut from the side thereof, and means for moving the cutting blade in contact with the article to be cut, said guiding rollers and said blade constituting the means for holding the cutting tool in cutting position on the clamp means and the article.

References Cited in the file of this patent

UNITED STATES PATENTS

| | | | |
|---|---|---|---|
| 377,725 | Thompson | Feb. 7, | 1888 |
| 1,177,721 | Potter | Apr. 4, | 1916 |
| 2,317,944 | Schaefer | Apr. 27, | 1943 |
| 2,539,124 | Findlay | Jan. 23, | 1951 |
| 2,735,175 | Tallman | Feb. 21, | 1956 |
| 2,747,274 | Willard et al. | May 29, | 1956 |
| 2,933,810 | Laval | Apr. 26, | 1960 |
| 3,022,575 | Wright | Feb. 27, | 1962 |